(12) United States Patent
Takagi et al.

(10) Patent No.: US 7,568,663 B2
(45) Date of Patent: Aug. 4, 2009

(54) ELECTRONIC APPARATUS

(75) Inventors: Manabu Takagi, Sagamihara (JP); Shinji Masuda, Hino (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 604 days.

(21) Appl. No.: 10/527,131

(22) PCT Filed: Jul. 31, 2003

(86) PCT No.: PCT/JP03/09759
§ 371 (c)(1),
(2), (4) Date: Mar. 8, 2005

(87) PCT Pub. No.: WO2004/024509
PCT Pub. Date: Mar. 25, 2004

(65) Prior Publication Data
US 2005/0236527 A1 Oct. 27, 2005

(30) Foreign Application Priority Data
Sep. 10, 2002 (JP) ............................ 2002-264453

(51) Int. Cl.
*G12B 9/00* (2006.01)
(52) U.S. Cl. ..................... 248/27.1; 720/646; 720/647
(58) Field of Classification Search ............... 248/27.1, 248/27.3; 361/681; 307/9.1, 10.1; 455/348, 455/345; 720/646, 647
See application file for complete search history.

(56) References Cited

U.S. PATENT DOCUMENTS 4,496,943 A * 1/1985 Greenblatt ............... 379/93.17

(Continued)

FOREIGN PATENT DOCUMENTS

JP 06-087095 12/1994

(Continued)

OTHER PUBLICATIONS

International Search Report, Nov. 4, 2003.

(Continued)

*Primary Examiner*—Jayprakash N Gandhi
*Assistant Examiner*—Quinn Hunter
(74) *Attorney, Agent, or Firm*—Eric J. Robinson; Robinson Intellectual Property Law Office, P.C.

(57) ABSTRACT

An electronic apparatus that is protected from theft, and is provided with panels having excellent operability and viewability. The apparatus comprises a hosing, and a first panel and second panel provided on the front face side of the housing. An operation section is provided on one face of the first panel, a display section is provided on one face of the second panel, and a panel cover that can hide the front face of the housing is provided on the other face of the first panel. A slider is provided in the housing, and the slider is movable in forward and backward directions of the housing. There is provided panel-rotating means, which functions such that, when the first panel and second panel are received in the housing side, the means raises and holds the operation section and display section in the vertical direction in an opposed manner, and, when the slider is moved forward, the means rotates the first panel so that the upper end section of the first panel is moved forward, and rotates the second panel so that the upper end section of the second panel is moved backward.

8 Claims, 4 Drawing Sheets

U.S. PATENT DOCUMENTS

| | | | |
|---|---|---|---|
| 4,704,604 A * | 11/1987 | Fuhs | 361/680 |
| 4,874,110 A * | 10/1989 | Klein et al. | 220/241 |
| 5,082,336 A * | 1/1992 | Munch et al. | 312/292 |
| 5,307,327 A * | 4/1994 | Green et al. | 369/12 |
| 5,388,032 A * | 2/1995 | Gill et al. | 700/17 |
| 5,467,947 A * | 11/1995 | Quilling, II | 248/27.1 |
| 5,848,042 A * | 12/1998 | Takahashi et al. | 720/647 |
| 6,353,531 B1 * | 3/2002 | Howell et al. | 361/683 |
| 6,659,405 B1 * | 12/2003 | Takagi et al. | 248/27.1 |
| 6,690,574 B2 * | 2/2004 | Kasahara et al. | 361/683 |
| 6,935,597 B2 * | 8/2005 | Shibuya | 248/27.1 |
| 7,119,455 B2 * | 10/2006 | Kishi et al. | 307/9.1 |
| 7,159,226 B2 * | 1/2007 | Sasaki et al. | 720/646 |
| 2002/0122370 A1 | 9/2002 | Sasaki et al. | |
| 2002/0135231 A1 * | 9/2002 | Miura | 307/10.1 |

FOREIGN PATENT DOCUMENTS

| | | |
|---|---|---|
| JP | 07-246886 | 9/1995 |
| JP | 09-286283 | 11/1997 |
| JP | 2002-166786 | 6/2002 |
| JP | 2002-178842 | 6/2002 |

OTHER PUBLICATIONS

European Search Report dated Nov. 4, 2005 for Application Serial No. 03795207.4.

Written Notification of Reason for Refusal (Japanese Application No. 2004-535865) dated Jun. 6, 2008.

* cited by examiner

ELECTRONIC APPARATUS

TECHNICAL FIELD

The present invention relates to an electronic apparatus provided with panels including operation button, screen display unit, etc.

BACKGROUND ART

Conventionally, there have been known electronic apparatuses provided on the front face thereof with panels (operation panels) including operation button, screen display unit, etc., which panels are constructed in a movable manner. The electronic apparatuses are used in car audio systems, liquid crystal display TV sets, car navigation systems, etc., for example.

Especially, in the electronic apparatuses used in automobiles, etc., various methods have been devised so that protection from theft is achieved.

For example, in an electronic apparatus for automobile use disclosed in Japanese Patent Laid-Open No. 123842/1997, a driving mechanism installed in the main body of apparatus is used to gradually rotate an operation panel disposed on the front face of the apparatus and then stop the rotation of the operation panel at the time when its rear face faces the front. Specifically, when the electronic apparatus for automobile use is received in the installing location in the car, the operation panel stops with the rear face thereof facing the front. Accordingly, it looks to the third person as if no electronic apparatus is installed in the car. Thus, protection from theft is achieved.

Also, in an electronic apparatus for automobile use disclosed in Japanese Patent Laid-Open No. 202764/2001, a holder from which an operation panel is detachable is made rotatable as described above, whereby the electronic apparatus for automobile use cannot be used when the operation panel is removed, and at the same time the installing location of the operation panel is hidden. Accordingly, the electronic apparatus is hardly stolen by the third person.

However, in the electronic apparatuses for automobile use disclosed in the two patent documents described above, on the sides of the operation panel, there is provided a mechanism for rotating the operation panel. Consequently, the area of the operation panel becomes smaller compared to the area of the entire front face of the housing of the electronic apparatus, thus damaging the operability of the operation panel, or lessening the size of the screen display section.

Also, since the operation buttons, screen display section, etc. are arranged on the same face, the angle of each section cannot be adjusted independently. Thus, the display screen cannot be easily viewed, and the buttons cannot be easily operated.

DISCLOSURE OF THE INVENTION

Accordingly, an object of the invention is to provide an electronic apparatus that is protected from theft, and is provided with panels having excellent operability and viewability.

In order to solve the above problems, in accordance with a first aspect of the invention, there is provided an electronic apparatus comprising a housing holding the main body of apparatus, a first panel provided on the front face side of the housing, and a second panel provided behind the first panel, wherein: an operation section is provided on one face of the first panel, a display section is provided on one face of the second panel, and a panel cover that can hide the front face of the housing is provided on the other face of the first panel; a slider is provided in the lower section of the housing, the slider is movable in forward and backward directions of the housing, and the first panel and second panel are linked to the slider so that the first panel and second panel with the lower end section thereof serving as the axis of rotation can rotate independently of each other; the slider is provided with panel-rotating means, which functions such that, when the first panel and second panel are received in the housing side, the means raises and holds the operation section of the first panel and the display section of the second panel in the vertical direction of the housing in an opposed manner, and when the slider is moved forward, the means rotates the first panel so that the upper end section of the first panel is moved forward out of the housing, and rotates the second panel so that the upper end section of the second panel is moved backward out of the housing, whereby the operation section of the first panel and the display section of the second panel are unfolded to an usable state.

In accordance with a second aspect of the invention, there is provided an electronic apparatus of the first aspect of the invention, wherein, when the slider is moved forward to its full extent out of the housing, the operation section of the first panel and the display section of the second panel are unfolded to a substantially horizontal state.

In accordance with a third aspect of the invention, there is provided an electronic apparatus of the first or second aspect of the invention, wherein operation buttons are provided in the operation section of the first panel, and a screen display unit is provided in the display section of the second panel.

In accordance with a fourth aspect of the invention, there is provided an electronic apparatus of any one of the first to third aspects of the invention, wherein: the panel-rotating means for rotating the first panel so that the upper end section of the first panel is moved forward out of the housing is a mechanism for rotating the axis of rotation located in the lower end section of the first panel by means of a driving unit installed in the slider; the panel-rotating means for rotating the second panel so that the upper end section of the second panel is moved backward is a mechanism for moving the tip end section of an arm installed rotatably in the vicinity of the upper end section of the second panel from the upper section to the lower section inside of the housing as the slider is moved forward out of the housing.

In accordance with a fifth aspect of the invention, there is provided an electronic apparatus of any one of the first to fourth aspects of the invention, wherein a space is formed between the housing and the upper end section of the second panel when the upper end section of the second panel is rotated so as to move backward out of the housing, and the main body of apparatus having a recording-medium insertion slot or groove used to remove and insert a recording medium through the space is held inside the housing behind the second panel.

In accordance with a sixth aspect of the invention, there is provided an electronic apparatus of any one of the first to fifth aspects of the invention, wherein the slider is provided with panel-angle adjusting means for adjusting the rotation angle of the first panel and second panel when the slider is moved forward out of the housing.

In accordance with a seventh aspect of the invention, there is provided an electronic apparatus of any one of the fourth to sixth aspects of the invention, wherein: the panel-angle adjusting means for the first panel is a mechanism for rotating the axis of rotation located in the lower end section of the first panel by means of the driving unit installed in the slider; and the panel-angle adjusting means for the second panel is a mechanism for moving the tip end section of the arm installed rotatably in the vicinity of the upper end section of the second panel from the upper section to the lower section inside of the housing as the slider is moved forward out of the housing.

In accordance with an eighth aspect of the invention, there is provided an electronic apparatus of the seventh aspect of the invention, wherein the rotation angle of the first panel can be adjusted within a range of approximately 180 degrees from the position at which the first panel is raised in the vertical direction; and the rotation angle of the second panel can be adjusted within a range of approximately 90 degrees from the position at which the second panel is raised in the vertical direction.

In accordance with a ninth aspect of the invention, there is provided an electronic apparatus of any one of the first to eighth aspect of the invention, wherein the panel cover is detachably attached to the first panel.

BEST MODE FOR CARRYING OUT THE INVENTION

By taking as an example an electronic apparatus installed in a car, an embodiment of the electronic apparatus according to the invention will now be described with reference to the drawings. The terms "forward and backward directions, left and right directions, and vertical direction" used in the following descriptions each refer to the direction employed when an electronic apparatus to be operated is viewed from the inside of the car.

Figure 1:
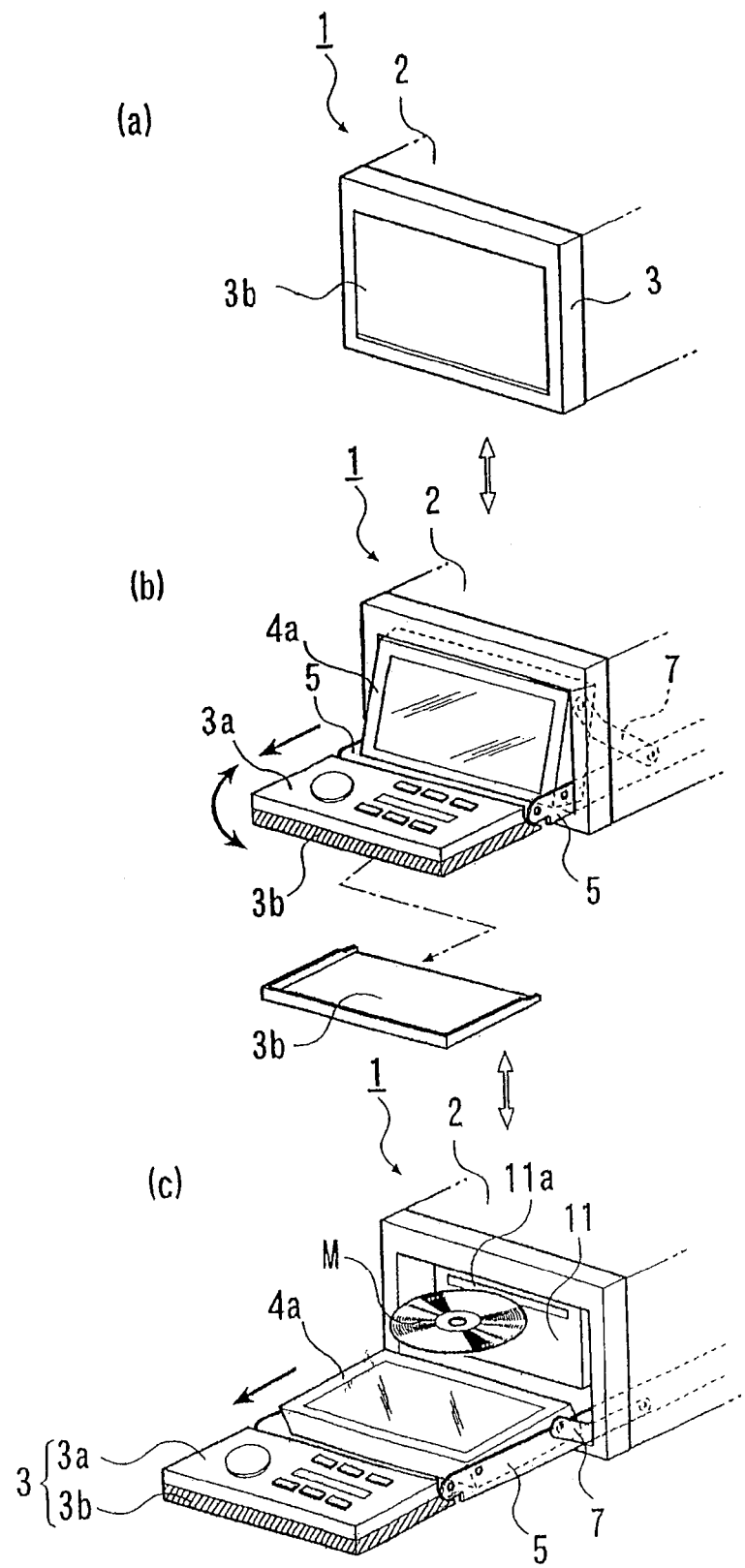
FIG. 1 is a perspective view showing an operation of an exemplary electronic apparatus according to the invention.
Figure 2:
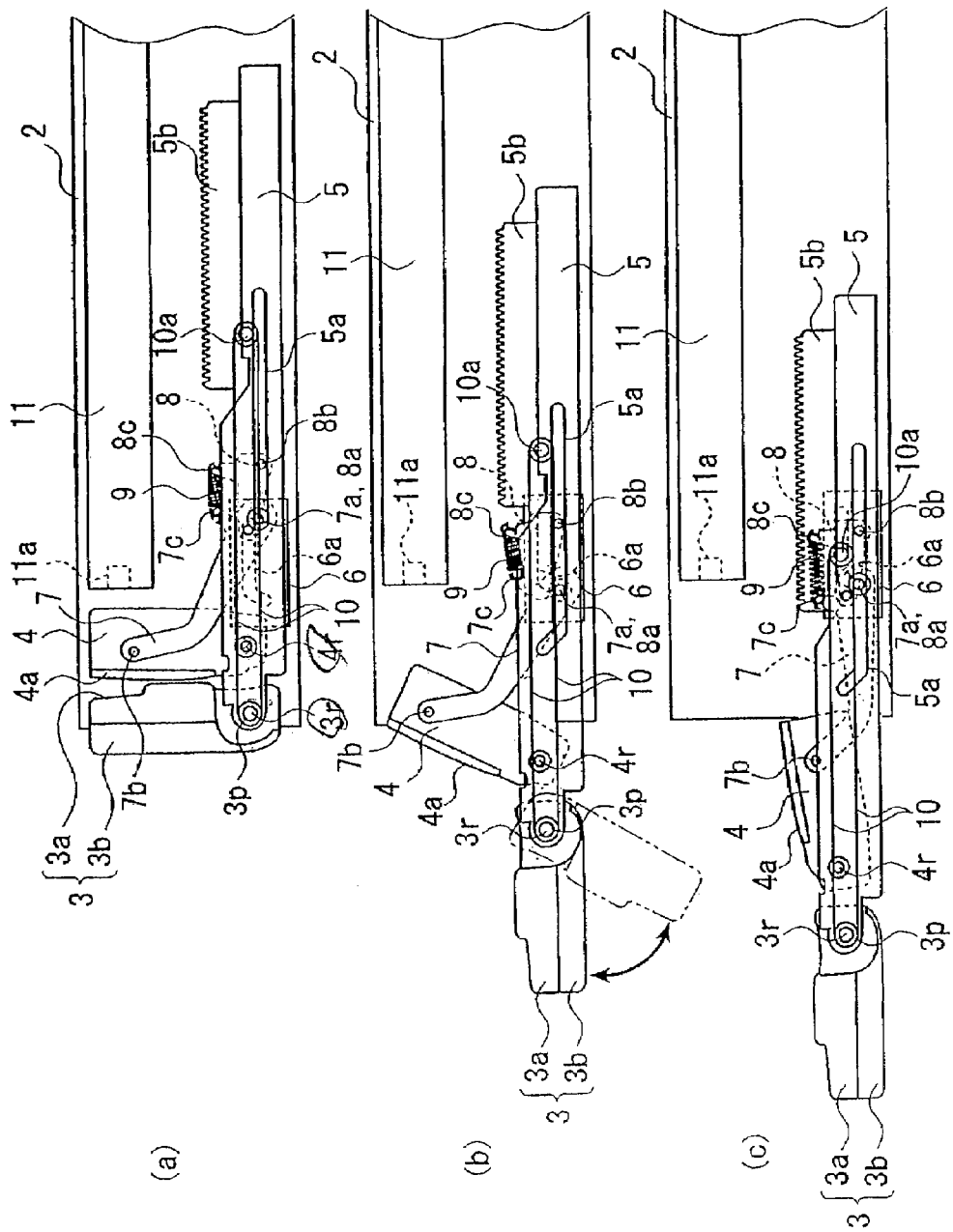
FIG. 2 is a side view showing the operation of the exemplary electronic apparatus according to the invention.
Figure 3:
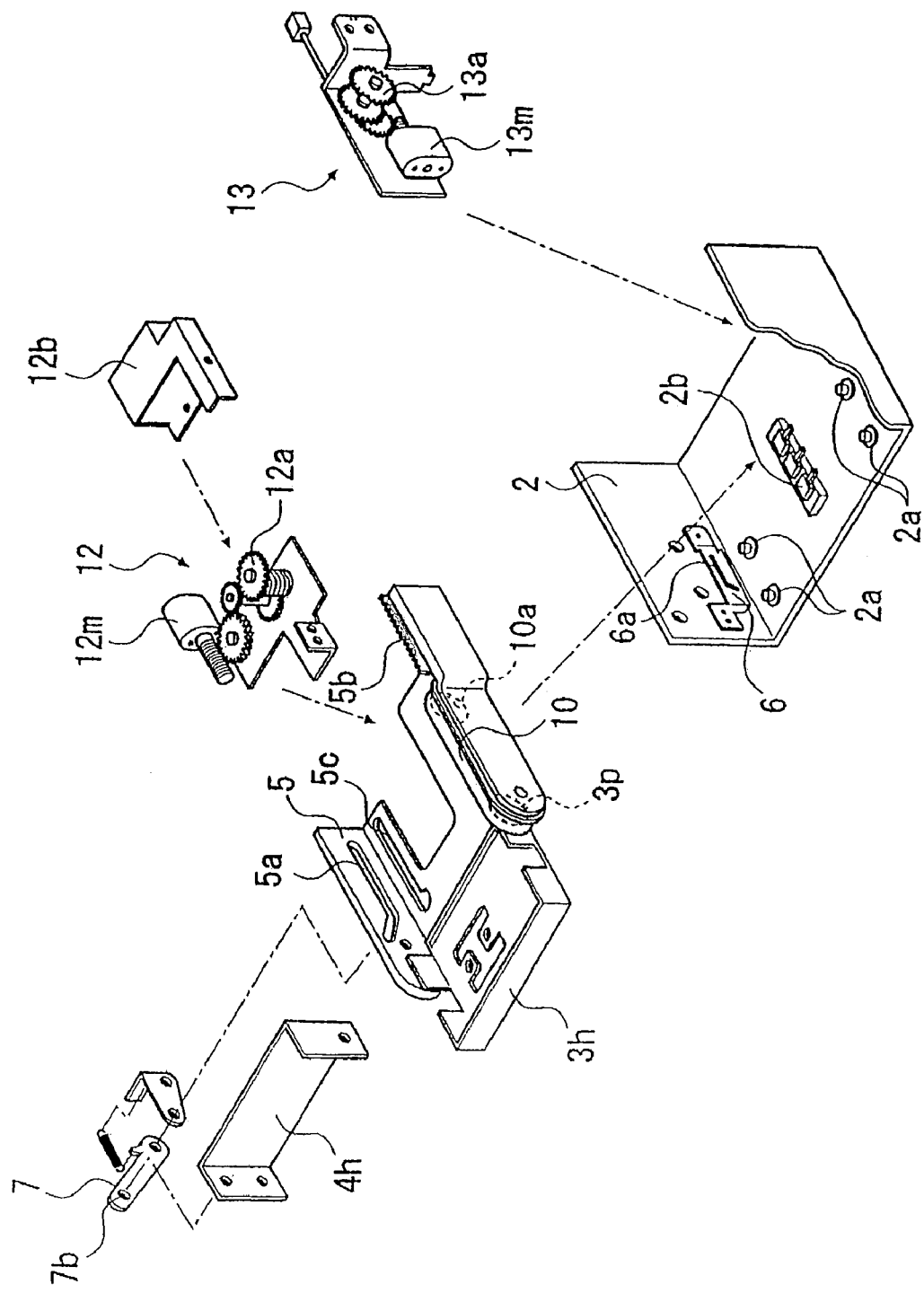
FIG. 3 is an exploded perspective view showing the exemplary electronic apparatus according to the invention.
Figure 4:
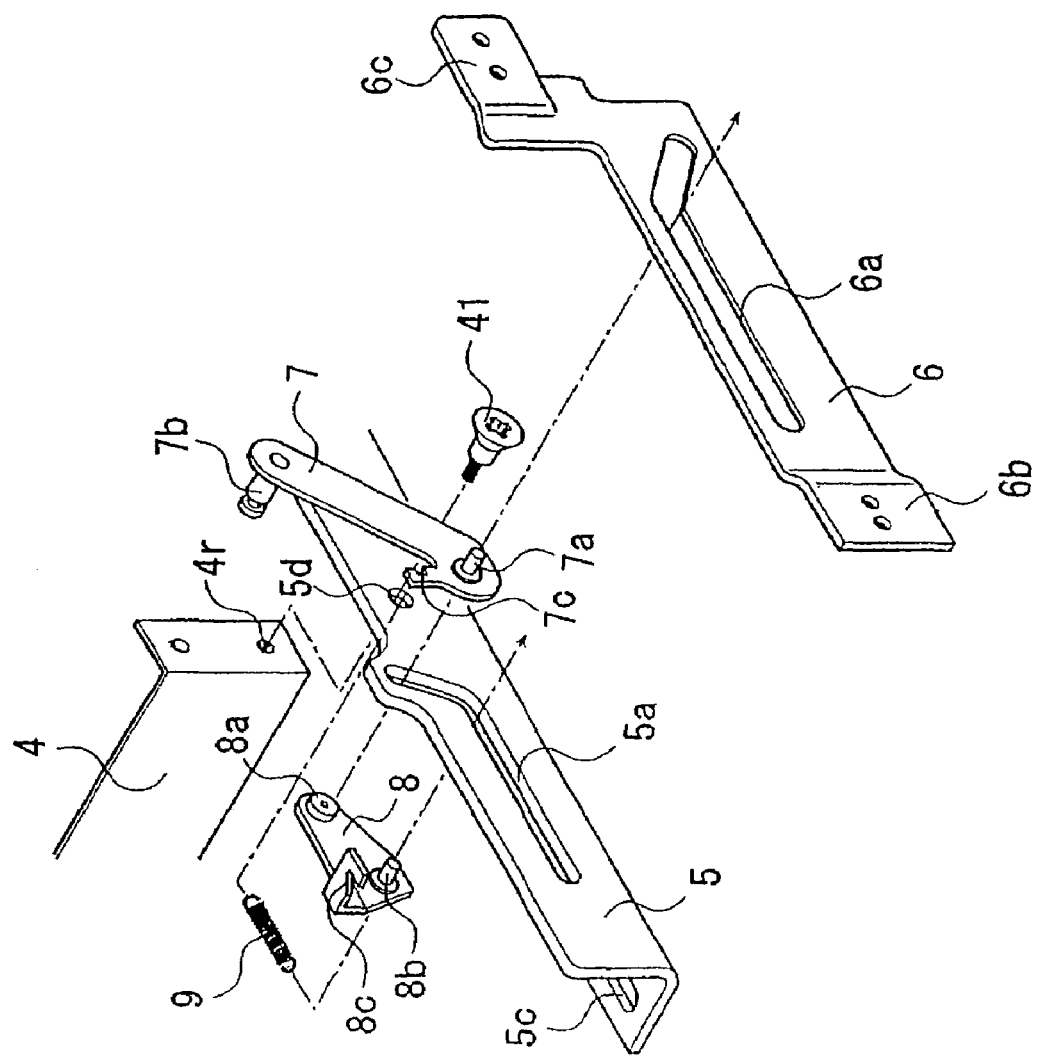
FIG. 4 is an exploded perspective view showing the substantial part related to FIG. 3.

FIG. 1 is a perspective view showing an operation of an electronic apparatus 1 according to the embodiment; FIG. 2 is a side view showing the operation of the electronic apparatus 1 according to the embodiment; FIG. 3 is an exploded perspective view showing the electronic apparatus 1; and FIG. 4 is an exploded perspective view showing the substantial part related to FIG. 3.

As shown in FIGS. 1 to 4, the electronic apparatus 1, used as one DIN-size car audio system, car navigation system or the like installed in a car dashboard (not shown), includes a housing 2, a first panel (outer panel) 3 disposed on the front face side of the housing 2, and a second panel (inner panel) 4 disposed behind the first panel.

As shown in FIGS. 1 and 2, in the lower section of the housing 2, there is provided a slider 5 capable of sliding in forward and backward directions of the housing 2. As shown in FIG. 3, on the bottom face of the slider 5, there are formed a slot 5c. The slot 5c engages with projections 2a protruding from the bottom face of the housing 2, thus allowing the slider 5 to smoothly slide in forward and backward directions of the housing 2.

As shown in FIG. 3, a rack 5b is fastened to the slider 5. The rack 5b gears with a pinion 13a fastened to the side face of the housing 2. As shown in FIGS. 1 and 2, when the pinion 13a is rotated with the operation of a motor 13m, the slider 5 slides in forward and backward directions of the housing 2.

As shown in FIG. 2, the first panel 3 and second panel 4 are linked to the slider 5 so that the panels 3 and 4 can rotate independently of each other around pins 3r and 4r each disposed in the lower end section of the panels (in FIGS. 3 and 4, there is illustrated a case where the lower end sections of holders 3h and 4h of the first panel 3 and second panel 4 are rotatably attached to the slider 5 with pins.)

As shown in FIGS. 1 and 2, on one face of the first panel 3 and second panel 4, there are provided an operation section 3a and a display section 4a, respectively. In the operation section 3a and display section 4a, there are disposed operation buttons and a screen display unit, respectively. Also, on the side opposite to the face on which the operation section 3a of the first panel 3 is disposed, there is provided a panel cover 3b capable of hiding the front face of the housing 2 when the first panel 3 and second panel 4 are received in the housing 2 side.

As shown in FIG. 1(b), when the slider 5 is protruded forward from the housing 2, the panel cover 3b is detachably attached to the first panel 3.

As shown in FIGS. 1(a) and 2(a), when the first panel 3 and second panel 4 are received in the housing 2 side, the operation section 3a and display section 4a are raised and held in the vertical direction of the housing 2 in an opposed manner by slider 5, and the front face of the housing 2 is covered with the panel cover 3a of the first panel 3.

Also, as shown in FIGS. 1(b) and 1(c) and FIGS. 2(b) and 2(c), when the slider 5 is moved forward out of the housing 2, the first panel 3 is rotated around the pin 3r located at the lower end section of the first panel 3 so that the upper end section of the first panel 3 is moved forward out of the housing 2, and at the same time the second panel 4 is rotated around the pin 4r located at the lower end section of the second panel 4 so that the upper end section of the second panel 4 is moved backward out of the housing 2, whereby the operation section of the first panel 3 and the display section of the second panel 4 are unfolded so that they can be used.

As shown in FIGS. 1 and 2, inside the housing 2, there is held the main body of apparatus 11 including reproducing units for recording media M, such as CD, CD-ROM, DVD, MD and cassette tape.

As shown in FIGS. 1(c) and 2(c), when the slider 5 is protruded forward to its full extent out of the housing 2, the first panel 3 and second panel 4 is in a substantially horizontal state relative to the slider 5. In this state, it is possible to remove and insert a recording medium M from/to a recording-medium insertion slot or groove 11a provided in the main body of apparatus 11 through a space formed between the housing 2 and the upper end section of the second panel 4.

As shown in FIGS. 2 and 3, a pulley 3p having the same axis as the pin 3r located at the lower end section of the first panel 3 is fastened to the holder 3h of the first panel 3. A panel rotating belt 10 is provided along the sliding direction of the slider 5 between the pulley 3p and a pulley 10a disposed behind the pulley 3p.

On the slider, there is attached a belt driving unit 12 for driving the panel rotating belt 10. When a motor 12m of the belt driving unit 12 is operated, the pulley 10a is rotated via a gear 12a by the rotation of the motor 12m, whereby the first panel 3 is rotated around the pin 3r located at the lower end section of the first panel 3.

The belt driving unit 12 is covered with a cover 12b. Thus, even when the belt driving unit 12 is moved in the housing 2 together with the slider 5, the gear of the belt driving unit is prevented from hitting against the wiring, etc. located inside the housing 2.

As shown in FIGS. 2 to 4, a cam 6 with a cam slot 6a is attached to the inner side wall of the housing 2 along the forward and backward directions of the housing 2. The cam slot 6a is bored in a shape such that the tip end section of the cam slot bends downward in the front side of the housing 2.

On the side face of the slider 5, as shown in FIGS. 2 to 4, there is formed a slider slot 5a along the sliding direction of the slider 5. The slider slot 5a is bored in a shape such that the tip end section of slider slot bends upward in the front side of the housing 2.

On the side face of the upper end section of the second panel 4 fastened with the pin 4r to the side face of the slider 5, as shown in FIGS. 2 to 4, there is rotatably attached the tip end section of an arm 7 for rotating the second panel 4, with a pin 7b.

In the other end section of the arm 7, there is formed a pin 7a. As shown in FIG. 4, a pin 8a of an arm bracket 8 is rotatably attached to the pin 7a. The arm bracket has another pin 8b formed therein. The pins 8a and 8b slide along the slider slot 5a together with the pin 7a of the arm 7.

As shown in FIG. 4, in the vicinity of the pin 7a of the arm 7, there is formed a notch 7c; in the vicinity of the pin 8b of the arm bracket, there is formed a notch 8c. An arm spring is hung between the notches 7c and 8c, whereby the arm bracket 8 is pulled toward the arm 7. Accordingly, as shown in FIGS. 2(*a*) and 2(*b*), when there is no external force working on the arm bracket 8, the arm bracket 8 remains located in the tip end section of the slider slot 5a in the front side of the housing 2, whereby the angle of the arm 7 relative to the slider 5 is maintained.

The operation of the electronic apparatus 1 of the first panel 3, second panel 4, and slider 5 will now be described with reference to FIGS. 2(*a*) to 2(*c*).

As shown in FIG. 2(*a*), when the slider 5 is wholly received in the housing 2 side, the first panel 3 and second panel 4 are, as described above, raised in the vertical direction of the housing 2 and held by the slider 5, and the front face of the housing 2 is covered with the panel cover 3a of the first panel 3. In this state, the pin 7a of the arm 7 and the pin 8a of the arm bracket 8 are located in the forefront of the slider slot 5a of the slider 5, and are located in the rear of the cam slot 6a of the cam 6.

As shown in FIG. 2(*b*), when the slider 5 is moved forward out of the housing 2, the lower end sections of the first panel 3 and second panel 4 each attached to the slider 5 are similarly moved forward out of the housing 2.

On the way, the pin 7a of the arm 7 and the pin 8a of the arm bracket 8 are moved along the cam slot 6a of the cam 6, and stop when the forefront of the cam slot 6a is reached. Accordingly, the pin 7a of the arm 7 and the pin 8a of the arm bracket 8 are lowered to the height of the slider slot 5a of the slider 5. When the slider 5 is further moved forward out of the housing 2, the upper end section of the second panel 4 is inclined backward relative to the lower end section of the second panel 4.

Also, in this case, the first panel 3 is rotated by the operation of the panel rotating belt 10 so that the upper end section of the first panel 3 is moved forward out of the housing 2. Then, the first panel 3 stops at an angle substantially parallel with the sliding direction of the slider 5, whereby the operation panel 3a is exposed on the upper side of the first panel 3.

In this state, the operation buttons installed in the operation panel 3a are operated to drive the panel rotating belt 10 so that the angle of the first panel 3 can be adjusted.

As shown in FIG. 2(*c*), when the operation buttons installed in the operation panel 3a are operated, while the pin 7a of the arm 7 and the pin 8a of the arm bracket 8 remain stopped after moving along the cam slot 6a of the cam 6 to reach the forefront of the cam slot 6a, the slider 5 is moved forward out of the housing 2 so that the second panel 4 is in a substantially horizontal state relative to the slider 5. In this state, it becomes possible to remove and insert a recording medium M from/to the recording-medium insertion slot 11a provided in the main body of apparatus 11 through a space formed between the housing 2 and the upper end section of the second panel 4.

In this way, according to the electronic apparatus 1 of the embodiment, when the first panel 3 and second panel 4 are received in the housing 2 side, the operation section 3a and display section 4a are inside opposed face-to-face with each other, thereby enabling the prevention of adhesion of dirt from the outside, theft, and so on.

In addition, the first panel 3 and second panel 4 are unfolded so that the operation buttons provided in the operation section 3a and the screen display unit provided in the display section 4a are exposed forward out of the housing 2. Consequently, compared with a structure in which a single panel, provided with operation buttons and a screen display unit, is half-turned to be received inside, there is obtained an electronic apparatus in which protection from theft is achieved and at the same time, a larger installing section for operation buttons, etc. and a larger screen display unit can be formed to achieve excellent operability.

Also, the angles of the first panel 3 and second panel 4 can be changed independently of each other. Accordingly, the operation buttons provided in the operation section 3a of the first panel can be adjusted to an angle such that the operation buttons can be easily pressed. At the same time, the screen display unit on the display section 4a of the second panel can be adjusted to an angle such that the screen display unit can be easily viewed.

In addition, in the electronic apparatus 1, the recording-medium insertion slot 11a is provided on the front face of the main body of apparatus 11 disposed inside the housing 2 behind the first panel 3 and second panel 4. However, the first panel 3 and second panel 4 can be rotated forward out of the housing 2 to a substantially horizontal state relative to the slider 5. Thus, at this time, a space is formed between the housing 2 and the upper end section of the second panel 4. Through this space, a recording medium M can be removed and inserted from/to the recording-medium insertion slot 11a.

Consequently, the recording-medium insertion slot 11a is not required to be exposed on the front face of the housing 2 when the first panel 3 and second panel 4 are received in the housing 2 side. Thus, the panels can occupy the space for the recording-medium insertion slot, whereby a larger panel can be provided.

In addition, the panel cover 3b of the first panel 3 is detachable from the first panel 3. Thus, if necessary, with the panel cover 3b removed from the first panel 3, the first panel 3 and second panel 4 are received in the housing 2 side. In this case, the internal structure of the first panel 3 can be exposed so that it looks as if some components of the electronic apparatus are missing, thereby achieving protection from theft.

It is noted that the invention is not limited to the above described embodiment. Many modifications and design changes with respect to the embodiment are possible without departing from the gist of the invention.

For example, in the embodiment, a case in which the invention is applied to a car audio system is described. The invention, however, is not limited thereto, but is also applicable to ordinary audio apparatuses, compact or mobile TV sets, car navigation apparatuses, and other various measurement apparatuses and home electric appliances.

It will easily be appreciated that other appropriate modifications to specific detailed structure, etc. are also possible.

ADVANTAGES OF THE INVENTION

According to the invention, when the first panel and second panel are received in the housing side, the operation section provided in the first panel and the display section provided in the second panel are inside opposed face-to-face with each other, thereby enabling the prevention of adhesion of dirt from the outside, theft, and so on.

In addition, the first panel and second panel are unfolded so that the operation section of the first panel and the display section of the second panel are exposed forward out of the housing. Consequently, compared with a structure in which a single panel with operation buttons and a screen display unit provided therein is half-turned to be received inside, there is obtained an electronic apparatus in which protection from theft is achieved and at the same time, a larger operation buttons or a larger screen display unit can be formed to achieve excellent operability.

The invention claimed is:

1. An electronic apparatus comprising:
   a housing (2) holding a main body of apparatus,
   a first panel (3) provided on the front face side of the housing, an operation section (3a) being provided on one face of the first panel,
   a second panel (4) provided behind the first panel and interlocked with the first panel, a display section (4a) being provided on one face of the second panel,
   a slider (5) provided in the lower section of the housing to be movable in forward and backward directions of the housing and linked to both the first panel and second panel, and
   an arm (7) linked to the second panel and said slider for rotating the second panel so that if the slider is moving forward, the upper end of the second panel is retracted backward relative to the lower end of the second panel,
   wherein a panel cover (3b), that can hide the front face of the housing, is provided on the other face of the first panel,
   wherein the first panel and second panel are interlocked with each other so as to be able to rotate about rotation axes (3r, 4r), and when the first panel and second panel are received in the housing side, the first and second panels are vertically juxtaposed in standing in front of the housing with the operation section of the first panel and the display section of the second panel being faced to each other,
   wherein when the slider is moved forward, the upper end of the first panel is moved forward and the upper end of the second panel is moved backward in such a manner that the first and second panel are rotated about respective rotation axes in an inverse direction to each other, whereby the operation section of the first panel and the display section of the second panel are unfolded to substantially horizontal state, and
   wherein a motor (12m) for controlling the rotation position of the first panel independently from the movement position of said slider, is provided.

2. The electronic apparatus according to claim 1, wherein, when the slider is moved forward to its full extent out of the housing, the surface of the operation section of the first panel and the surface of the display section of the second panel forms a substantially horizontal line.

3. The electronic apparatus according to claim 1 or 2, wherein a plurality of operation buttons are provided in the operation section of the first panel.

4. The electronic apparatus according to claim 1 or 2, wherein:
   one end of said arm is rotatably linked to the upper portion of the second panel so that the upper portion of the second panel falls down backwardly as said slider moves forwardly out of the housing.

5. The electronic apparatus according to claim 1 or 2, wherein a space is formed between the housing and the upper end section of the second panel when the upper end section of the second panel is retracted and a front surface of the apparatus having a recording-medium insertion slot used to remove and insert a recording medium through the space is installed inside the housing behind the second panel.

6. The electronic apparatus according to claim 1 or 2, wherein the slider is provided with panel-angle adjusting means (10) for adjusting the rotation angle of the first panel and second panel when the slider is moved forward out of the housing.

7. The electronic apparatus according to claim 6, wherein the rotation angle of the first panel can be adjusted within a range of approximately 180 degrees from the position at which the first panel is raised in the vertical direction; and the rotation angle of the second panel can be adjusted within a range of approximately 90 degrees from the position at which the second panel is raised in the vertical direction.

8. The electronic apparatus according to claim 1 or 2, wherein the panel cover is detachably attached to the first panel.

* * * * *